United States Patent
Urbanek et al.

(10) Patent No.: US 12,081,165 B2
(45) Date of Patent: Sep. 3, 2024

(54) SYSTEM, METHOD AND APPARATUS FOR PHOTOVOLTAIC ARRAY

(71) Applicant: Terrasmart, Inc., Cincinnati, OH (US)

(72) Inventors: Benjamin Allen Urbanek, Cincinnati, OH (US); David Anthony Compaan, Columbus, OH (US)

(73) Assignee: Terrasmart, Inc., Cincinnati, OH (US)

( * ) Notice: Subject to any disclaimer, the term of this patent is extended or adjusted under 35 U.S.C. 154(b) by 0 days.

(21) Appl. No.: 18/139,529

(22) Filed: Apr. 26, 2023

(65) Prior Publication Data

US 2023/0353082 A1 Nov. 2, 2023

Related U.S. Application Data

(60) Provisional application No. 63/336,482, filed on Apr. 29, 2022.

(51) Int. Cl.
*H02S 20/30* (2014.01)
*H02S 20/32* (2014.01)
*H02S 30/10* (2014.01)

(52) U.S. Cl.
CPC ............. *H02S 20/32* (2014.12); *H02S 30/10* (2014.12)

(58) Field of Classification Search
CPC .................................. H02S 20/32; H02S 30/10
See application file for complete search history.

(56) References Cited

U.S. PATENT DOCUMENTS

| | | | |
|---|---|---|---|
| 2017/0149375 A1* | 5/2017 | Bailey | F24S 30/425 |
| 2021/0211091 A1* | 7/2021 | Sgarrella | H02S 20/32 |
| 2022/0149774 A1* | 5/2022 | Palmer | F24S 50/60 |

FOREIGN PATENT DOCUMENTS

WO WO2022/008959 * 1/2022

* cited by examiner

*Primary Examiner* — Jayne L Mershon
(74) *Attorney, Agent, or Firm* — Wood Herron & Evans LLP (57) ABSTRACT

A photovoltaic (PV) tracking system can include PV modules having support frame assemblies. Base frame assemblies also can be included. Each base frame assembly can have an upper portion and a lower portion. The upper portion can be coupled to a respective support frame assembly such that the PV modules are oriented at a tilt angle with respect to horizontal to form a solar array of PV tables. Elongated members can extend in a north-south direction. Each elongated member can be coupled with a respective base frame assembly. The elongated members can rotate the PV tables about a rotational axis that is oriented at the tilt angle. The tilt angle can be fixed. A control unit can be coupled to the base frame assemblies and the elongated members such that the control unit rotates the PV tables about the rotational axis.

18 Claims, 5 Drawing Sheets

SYSTEM, METHOD AND APPARATUS FOR PHOTOVOLTAIC ARRAY

This application claims priority to and the benefit of U.S. Prov. Pat. App. No. 63/336,482, filed Apr. 29, 2022, which is incorporated herein by reference in its entirety.

BACKGROUND

Field of the Disclosure

The present disclosure relates in general to solar power and, in particular, a system, method and apparatus for a photovoltaic array with additional slope accommodation to increase the overall energy harvest from the sun.

Description of the Prior Art

Conventional solar power arrays are typically installed on flat land or a flat rooftop. The photovoltaic panels in the system are parallel to the underlying surface when in a neutral state. The panels track the arc of the sun across the sky by pivoting about an axis. The existing tracker market primarily comprises single axis trackers and a smaller portion of the market uses dual axis trackers. With the added complexity of dual axis tracking, there are significant cost impacts for the additional solar generation gain by being able to orient the solar modules optimally toward the sun via the two axes. Although known solutions are workable, improvements in solar tracking continue to be of interest.

SUMMARY

Embodiments of a photovoltaic (PV) tracking system, method and apparatus are disclosed. For example, the system can include PV modules having support frame assemblies. Base frame assemblies also can be included. Each base frame assembly can have an upper portion and a lower portion. The upper portion can be coupled to a respective support frame assembly such that the PV modules are oriented at a tilt angle with respect to horizontal to form a solar array of PV tables. Elongated members can extend in a north-south direction. Each elongated member can be coupled with a respective base frame assembly. The elongated members can be configured to rotate the PV tables about a rotational axis that is oriented at the tilt angle. The tilt angle can be fixed. A control unit can be coupled to the base frame assemblies and the elongated members. The control unit is configured to rotate the PV tables about the rotational axis. The plane of the solar modules oriented toward the sun can be fixed in the north-south direction while the solar array is able to rotate about the axis of the tracker from east to west.

BRIEF DESCRIPTION OF THE DRAWINGS

Before one or more embodiments are described in detail, one skilled in the art will appreciate that they are not limited in its application to the details of construction, the arrangements of components, and the arrangement of steps set forth in the following detailed description or illustrated in the drawings and descriptions. Rather, they are capable of other embodiments and of being practiced or being carried out in various ways. Also, it is to be understood that the phraseology and terminology used herein is for the purpose of description and should not be regarded as limiting.

DETAILED DESCRIPTION

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings.

The solutions described below provide additional gains over conventional designs by using a set angle to the solar module segments in the north/south direction of a single axis tracker, for example. The tracker can have several options of north/south slope depending on the region in which the tracker is constructed. The following techniques offer advantages beyond traditional designs by employing a fixed angle for the solar module segments along the north-south direction of a single-axis tracker. The tracker may offer several north-south slope options depending on its geographical location. For instance, trackers situated in northern regions can increase the angle in the north-south direction. The trackers can be segmented to minimize the elevation gain of the segments in the tracker rows. The extra slope can result in production gains in the solar array system.

Figure 1:
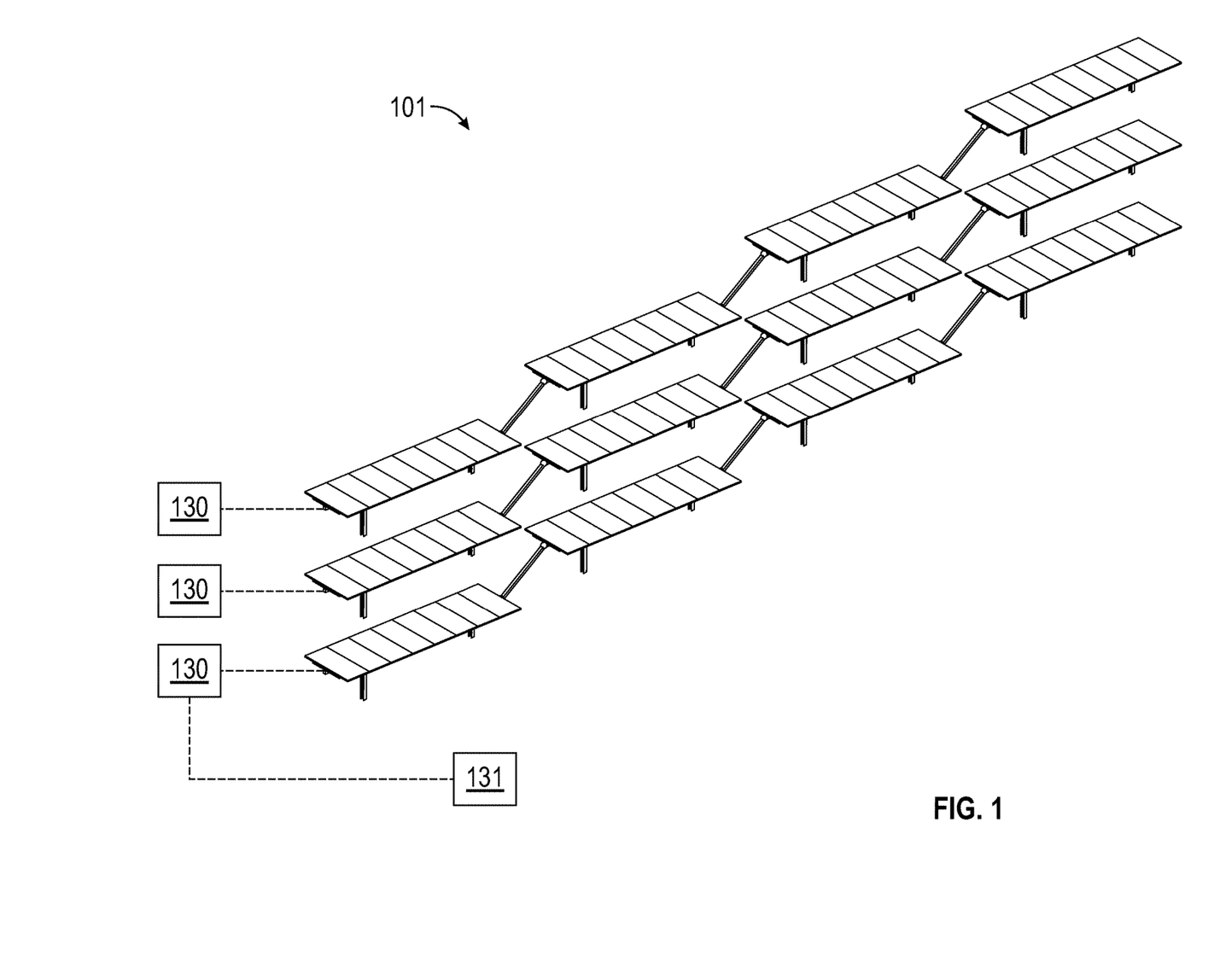
FIG. 1 is an isometric view of an embodiment of a solar array.
Figure 2:
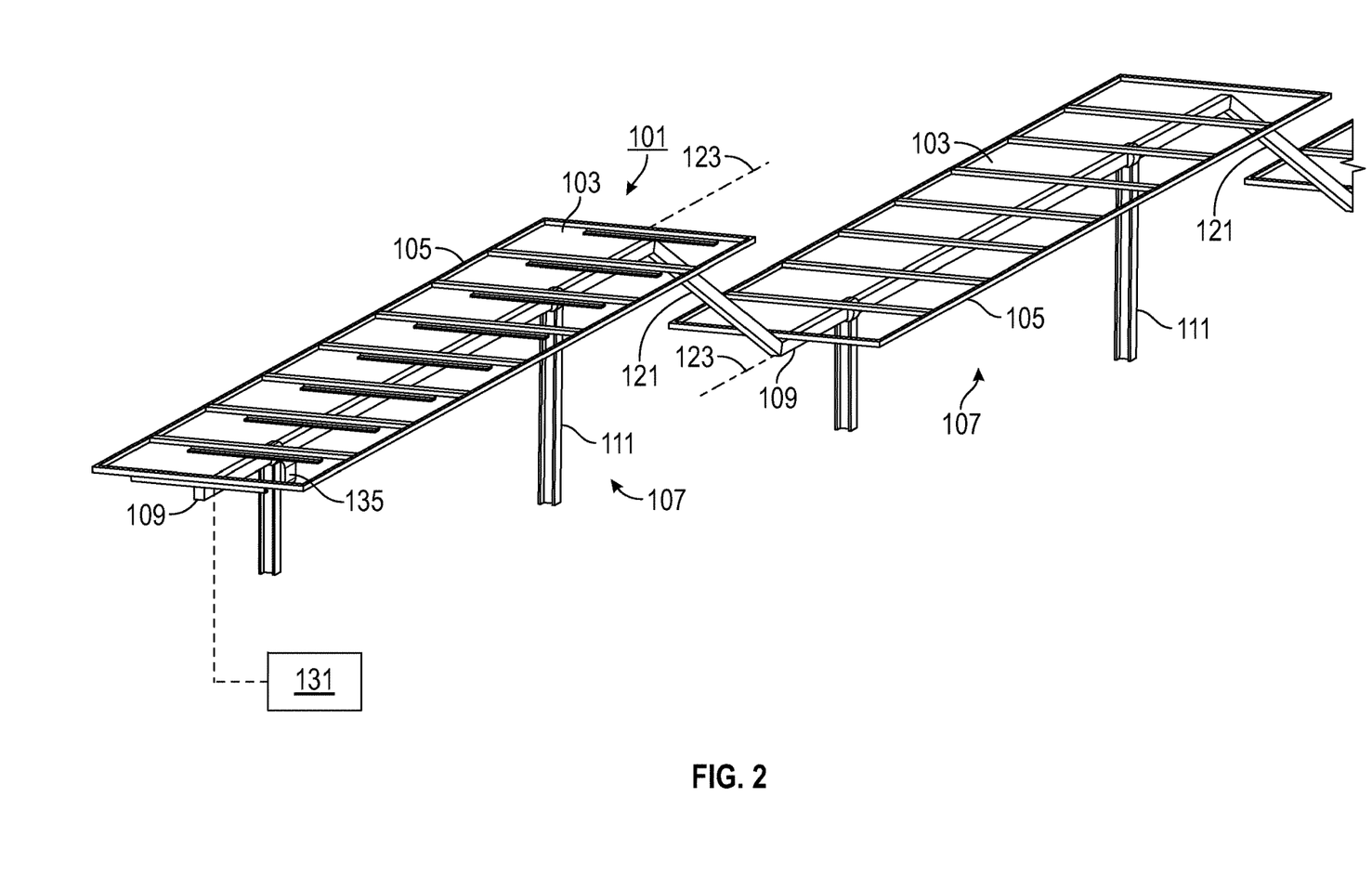
FIG. 2 is an isometric view of another embodiment of a portion of a solar array.
Figure 3:
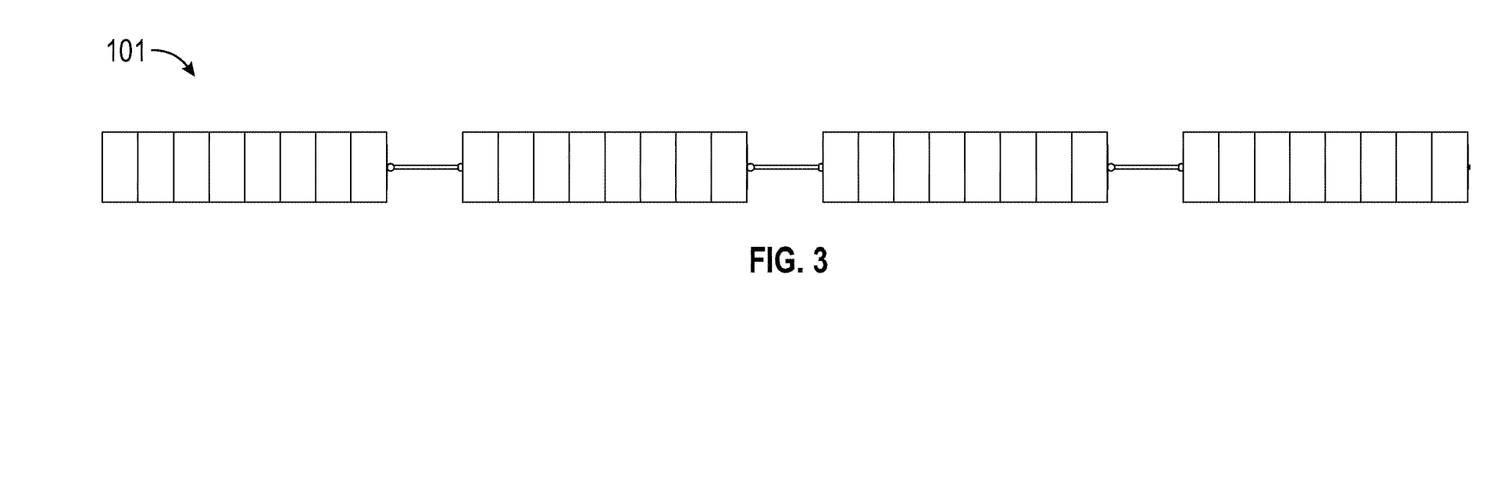
FIG. 3 is a top view of an embodiment of a portion of a solar array.
Figure 4:
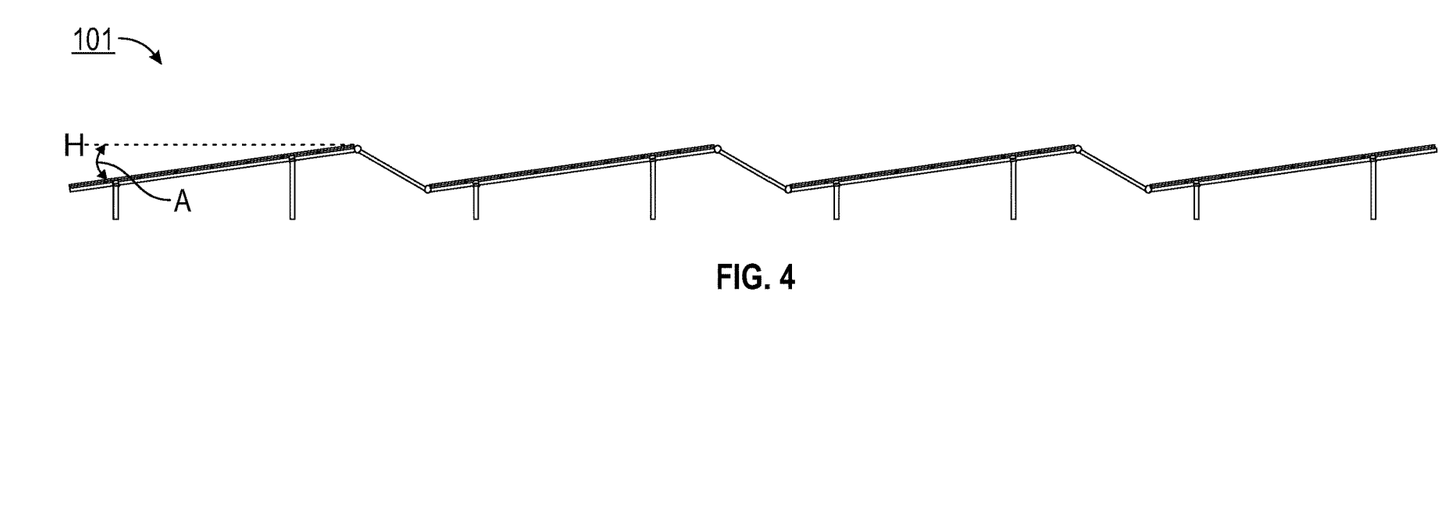
FIG. 4 is a side view of an embodiment of a portion of a solar array.
Figure 5:
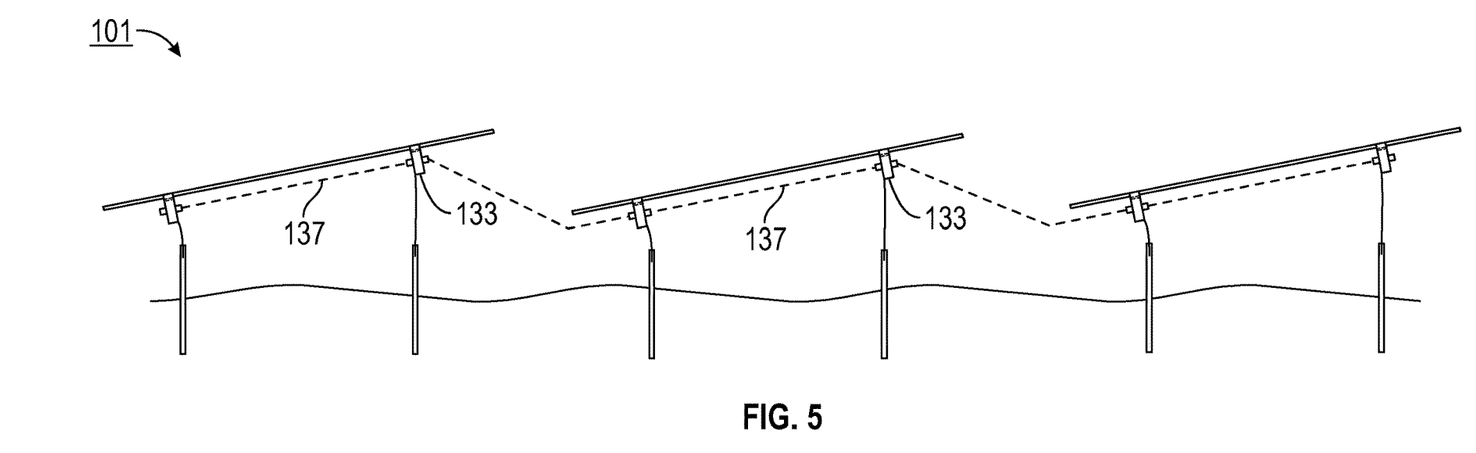
FIG. 5 a side view of another embodiment of a solar array.

Referring to FIGS. 1-6, embodiments of a photovoltaic (PV) tracking system 101 can include PV modules 103 having support frame assemblies 105. The support frame assemblies 105 can be integrated with the PV modules 103, or they can be separate and assembled. In addition, some of the PV modules 103 can be frameless. Embodiments can include base frame assemblies 107. The base frame assemblies 107 can vary in distance from each other, or be spaced apart at equal distances. Each base frame assembly 107 can include an upper portion 109 and a lower portion 111. The upper portion 109 can be coupled to a respective support frame assembly 105 such that the PV modules 103 can be oriented at a tilt angle A (FIG. 4) with respect to horizontal H to form a solar array of PV tables, as shown in FIG. 1.

In some versions, elongated members 121 are included and can extend in a north-south direction. Each elongated member 121 can be coupled with a respective base frame assembly 107. The elongated members 121 can be configured to rotate the PV tables about a rotational axis 123 that is oriented at the tilt angle A. The tilt angle A can be fixed. In one example, the tilt angle can be in a range of 3° to 15°. In another example, the tilt angle can be in a range of 3° to 8°.

Due to the tilt angle A of the PV tables, the PV tables may not be co-planar with respect to each other. In some versions, the PV modules 103 can be grouped on the PV tables, all of the PV modules 103 in a given PV table can be co-planar, and the PV modules 103 on different PV tables may not be co-planar.

Typically, a row of PV tables 103, such as about 90 of them, are connected together and can collectively be referred to as a "tracker." Each tracker can have a respective tracker control unit 130 (FIG. 1, shown schematically). A "solar array" is a group of multiple rows of PV tables 103 that can operate together, such as through a central control unit 131. Each tracker control unit 130 may be configured to monitor the angle at which the respective row of PV tables 103 is oriented. The tracker control units 130 may be implemented as separate computing devices corresponding to each of the rows of PV tables or a single computing device. In some examples a single computing device may implement functions of a plurality of the tracker control units 130 and the central control unit 131.

The central control unit 131 can monitor environmental conditions and can report any row that is not properly oriented or other issues. The central control unit 131 can perform advanced calculations to adjust the orientation of the individual rows to optimize system performance by reducing shadowing on adjacent rows. Embodiments can include coupling the central control unit 131 (e.g., wirelessly or hard-wired) to the base frame assemblies 107 and the elongated members 121. The central control unit 131 can be configured to rotate the PV tables about the rotational axis 123. For example only, the central control unit 131 is configured to control one or more actuators, motors, etc. (such as a gearbox and motor as describe below) mechanically coupled to respective components of the tracking system 101. Accordingly, the central control units 131 may be configured to perform calculations and, based on the calculations, generate one or more control signals to control respective actuators to adjust the orientations of the individual rows, rotate the PV tables, etc.

As used herein, the term "control unit" (e.g., with respect to the tracker control unit 130, the central control unit 131, etc.) may refer to a computing device or circuitry configured to perform corresponding functions. As one example, each control unit may include one or more processors or processing devices configured (e.g. specifically programmed) to execute instructions stored in memory to perform functions according to the principles of the present disclosure.

Figure 6:
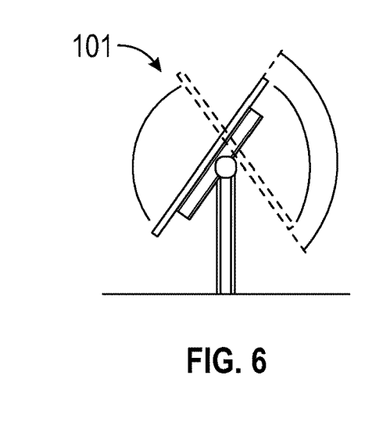
FIG. 6 is an end view of an embodiment of a solar array depicting a range of motion.

As depicted in FIG. 6, the central control unit 131 can be configured to adjust a rotational angle of the PV tables. For example, the rotational angle can be in a range of 0° to 120° (from −60° in an easterly direction to +60° in a westerly direction) relative to the rotational axis 123.

Embodiments of the PV tracking system 101 can include the base frame assemblies 107 extending along the north-south direction. The rotational axis 123 can extend along the north-south direction. Accordingly, the solar array can be configured to be angled from horizontal in the north-south direction and can rotate about the rotational axis 123 from east to west, in some versions.

Examples of the central control unit 131 can further comprise a torque member 133 (FIG. 5) that can be configured to articulate the solar array. The torque member 133 can be a bearing assembly. For example, it could include plastic bearings or mechanical roller bearings to allow a torque member 133, such as a torque tube 137, to rotate with minimal resistance. The torque member 133 also could be a slew drive linked with an adjacent lower portion 111 to control the amount of rotation and angle of the upper portion 109. In addition, the torque member 133 could be a gearbox connected to a motor in a group of tracker tables. The torque member 133 is responsive to control signals received from the central control unit 131, the tracker control units 130, etc.

The central control unit 131 also can include and/or communicate with a drive mechanism 135 (FIG. 2) coupled to the torque tube 137 (FIG. 5) which can extend along the rotational axis 123. Some versions of the drive mechanism 135 can be linked to the solar array in the north-south direction to connect adjacent ones of the PV tables extending in the north-south direction for rotational drive, in unison. In one example, a single motor responsive to the central control unit 131 can be used to rotate the PV tables. In another example, the PV tables can be wirelessly coupled to the central control unit 131 and configured to rotate via a plurality of motors responsive to the central control unit 131. The PV tables can be linearly arranged in the north-south direction.

Embodiments of the PV tracking system 101 can include a plurality of linear arrangements of PV tables (e.g., FIG. 1) that are not coupled to each other. Examples of the PV tracking system 101 can further include elongated members 121 that can extend substantially along the north-south direction.

Examples of the PV tracking system 101 can further include an adjacent PV table in the solar array that is mechanically linked to the PV tables with a single drive mechanism. Other examples of the PV tracking system 101 can further include additional adjacent PV tables in the solar array that are independently driven by linked motors to synchronously rotate. Still other versions can further include additional adjacent PV tables in the solar array that are synchronized to rotate with the PV tables responsive to the central control unit 131. The central control unit 131 can be the only control unit in the solar array, in one example, or one of a plurality of control units. In another example, a central control unit 131 can be configured to accommodate 150 row controllers. If a project is larger than that, however (e.g., 250 row controllers), the system may include at least one additional central control unit 131. In addition, the PV tables in the solar array can be physically connected and can be controlled via wireless communication.

These embodiments can increase system power generation by increasing the orientation of modules to the south. The system can be agnostic as to both the foundation it is built on and to the drivetrain that articulates the PV panels. The system can include segmented or continuous tables that slope toward the south.

From the structural standpoint, achieving a lower levelized cost of energy (LCOE) can be achieved in two ways. First, the cost of the structural components can be lowered while maintaining the overall energy harvest of the system. In addition, the LCOE can be reduced by increasing the overall energy harvest of the system while maintaining the overall system cost. The embodiments disclosed herein can contribute to both types of improvements by increasing the overall energy harvest while maintaining the overall system cost, and/or having any additional cost increases be outweighed by the added system production. The system can improve performance with a single axis tracker having its tracker axis in the north/south direction while adding a fixed tilt/slope to segments of the tracker rows in the east/west direction for increased production gain to the solar array.

Figure 7:
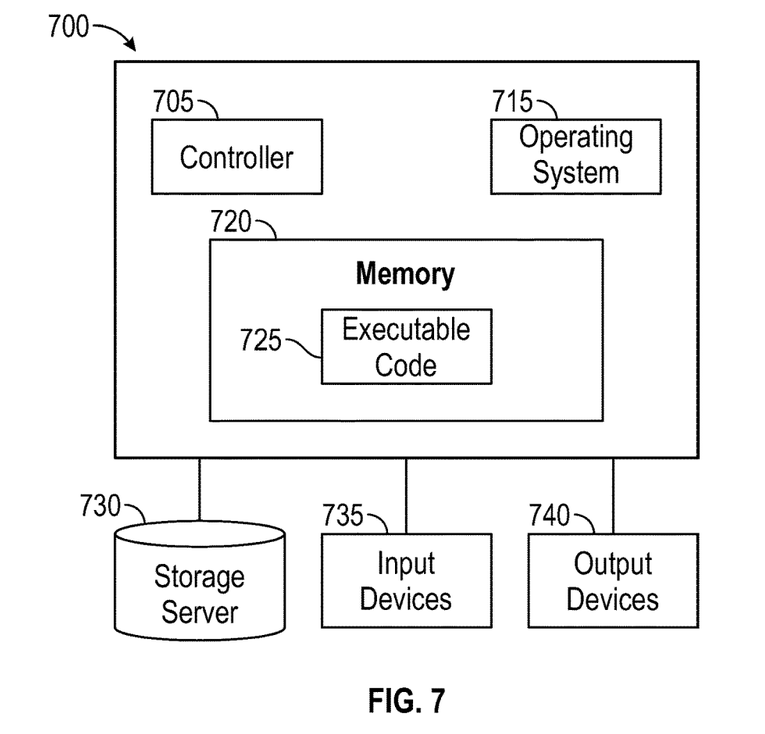
FIG. 7 is an example computing device configured to implement functions of a solar array.

FIG. 7 shows a block diagram of an example computing device 700 configured to (and/or including circuitry configured to) implement functions of the tracker control units 130 and/or the central control unit 131 according to some embodiments of the disclosure. Systems described herein may implement a single computing device, a plurality of computing devices, etc. configured to individually and/or collectively perform functions related to control of the tracking system 101. The computing device 700 may include a controller 705 that may be, for example, a central processing unit processor (CPU), a chip, or any suitable computing or computational device, an operating system 715, a memory 720, executable code 725, a storage server system 730, input devices 735, and output devices 740. The controller 705 (or one or more controllers or processors, possibly across multiple units or devices) may be configured to carry out methods described herein, and/or to execute or act as the various modules, units, etc. More than one of the computing devices 700 may be included in, and one or more of the computing devices 700 may act as the components of, a system according to embodiments of the disclosure. Various components of the computing device 700 may be implemented with same or different circuitry, same or different processors or processing devices, etc.

The operating system 715 may be or may include any code segment (e.g., one similar to the executable code 725 described herein) designed and/or configured to perform tasks involving coordination, scheduling, arbitration, supervising, controlling or otherwise managing operation of the computing device 700, for example, scheduling execution of software programs or tasks or enabling software programs or other hardware modules or units to communicate. The operating system 715 may be a commercial operating system. It will be noted the operating system 715 may be an optional component, e.g., in some embodiments, a system may include a computing device that does not require or include the operating system 715. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

The memory 720 may be or may include, for example, Random Access Memory (RAM), read only memory (ROM), Dynamic RAM (DRAM), Synchronous DRAM (SD-RAM), a double data rate (DDR) memory chip, Flash memory, volatile memory, non-volatile memory, cache memory, a buffer, a short term memory unit, a long term memory unit, or other suitable memory units or storage units. The memory 720 may be or may include a plurality of, possibly different memory units. The memory 720 may be a computer or processor non-transitory readable medium, or a computer non-transitory storage medium, e.g., RAM.

The executable code 725 may be any executable code, e.g., an application, a program, a process, task or script. The executable code 725 may be executed by the controller 705 possibly under control of the operating system 715. Although, for the sake of clarity, a single item of the executable code 725 is shown in FIG. 1, a system according to some embodiments of the disclosure may include a plurality of executable code segments similar to the executable code 725 that may be loaded into the memory 720 and cause the controller 705 to carry out methods described herein. Where applicable, the terms "process" and "executable code" may mean the same thing and may be used interchangeably herein. For example, verification, validation and/or authentication of a process may mean verification, validation and/or authentication of executable code.

The storage system 730 may be or may include, for example, flash memory as known in the art, memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in the storage system 730 and may be loaded from the storage system 730 into the memory 720 where it may be processed by the controller 705. In some embodiments, some of the components shown in FIG. 7 may be omitted. For example, the memory 720 may be a non-volatile memory having the storage capacity of the storage system 730. Accordingly, although shown as a separate component, the storage system 730 may be embedded or included in the memory 720.

The input devices 735 may be or may include any suitable input devices, components or systems, e.g., physical sensors such as accelerometers, thermometers, microphones, analog to digital converters, etc., a detachable keyboard or keypad, a mouse and the like. The output devices 740 may include one or more (possibly detachable) displays or monitors, motors, servo motors, speakers and/or any other suitable output devices. Any applicable input/output (I/O) devices may be connected to the computing device 700 as shown by blocks 735 and 740. For example, a wired or wireless network interface card (NIC), a universal serial bus (USB) device, JTAG interface, or external hard drive may be included in the input devices 735 and/or the output devices 740. It will be recognized that any suitable number of the input devices 735 and the output devices 740 may be operatively connected to the computing device 700 as shown by blocks 735 and 740. For example, the input devices 735 and the output devices 740 may be used by a technician or engineer in order to connect to the computing device 700, update software, and the like. Input and/or output devices or components 735 and 740 may be adapted to interface or communicate, with control or other units in the tracking system 101.

Embodiments may include an article such as a computer or processor non-transitory readable medium, or a computer or processor non-transitory storage medium, such as for example memory, a disk drive, or USB flash memory, encoding, including or storing instructions (e.g., computer-executable instructions, which, when executed by a processor or controller, carry out methods disclosed herein), a storage medium such as the memory 720, computer-executable instructions such as the executable code 725, and a controller such as the controller 705.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the disclosure may include components such as, but not limited to, a plurality of central processing units (CPU) or any other suitable multi-purpose or specific processors or controllers (e.g., controllers similar to the controller 705), a plurality of input units, a plurality of output units, a plurality of memory units, and a plurality of storage units, etc. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as the computing device 700.

Figure 8:
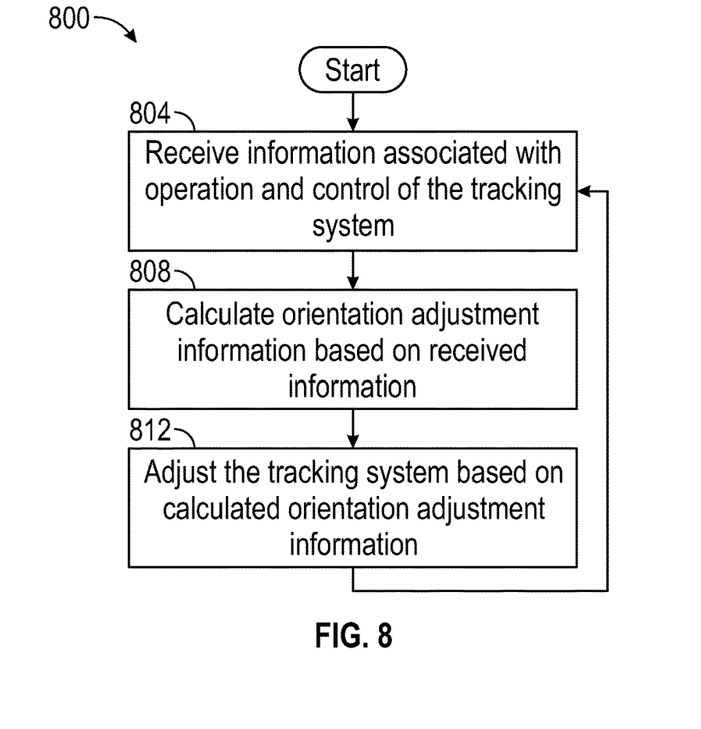
FIG. 8 illustrates steps of an example method of operating a tracking system of a solar array.

FIG. 8 illustrates steps of an example method 800 of operating a tracking system of a solar array according to the present disclosure. For example, one or more computing devices and/or related circuitry (e.g., circuitry configured to implement functions of the tracker control units 130, the central control unit 131, etc.) implement the steps of the method 800. In one example, the method 800 is implemented by one or more processing devices configured to execute instructions stored in memory.

At 804, the method 800 (e.g., the tracker control units, the central control unit 131, etc.) receives information associated with operation and control of the tracking system. The information may include, but is not limited to, monitored angles/orientations of the tables 103, environmental conditions affecting operation of the tracking system and/or the solar array, etc. The information may be received from various sensors or other input sources, such as respective sensors associated with each of the tables 103, the tracker control units 130, etc.

At 808, the method 800 (e.g., the central control unit 131) calculates, based on the received information, orientation adjustment information. For example, the method 800 calculates optimal angles/orientations/positions of each of the tables 103. The optimal orientations may be dependent upon environmental conditions, orientations of others of the tables 103, etc. In this manner, the optimal orientations correspond to positions that maximize solar exposure and minimize shadowing caused by adjacent rows/tables.

At 812, the method 800 (e.g., the central control unit 131) adjusts the tracking system based on the calculated optimal orientations. For example, the method 800 generates and outputs one more control signals to respective actuators, motors, etc. mechanically coupled to components of the tracking system adjust rotational angles of the tables 103.

Other embodiments can include one or more of the following items.

1. A photovoltaic (PV) system, comprising:
   PV modules having support frame assemblies;
   base frame assemblies, each having an upper portion and a lower portion,
   the upper portion is coupled to a respective support frame assembly such that the PV modules are oriented at a tilt angle with respect to horizontal to form a solar array of PV tables;
   elongated members extending in a north-south direction, each elongated member is coupled with a respective base frame assembly, and the elongated members are configured to rotate the PV tables about a rotational axis that is oriented at the tilt angle, which is fixed; and
   a control unit coupled to the base frame assemblies and the elongated members such that the control unit is configured to rotate the PV tables about the rotational axis.
2. The PV system wherein the tilt angle is in a range of 3° to 15°.
3. The PV system wherein the tilt angle is in a range of 3° to 8°.
4. The PV system wherein the control unit is configured to adjust a rotational angle of the PV tables in a range of 0° to 120° (from −60° in an easterly direction to +60° in a westerly direction) relative to the rotational axis.
5. The PV system wherein the base frame assemblies extend along a north-south direction, and the rotational axis extends along the north-south direction, such that the solar array is configured to be angled from horizontal in the north-south direction and can rotate about the rotational axis from east to west; and the control unit further comprises:
   at least one torque member configured to articulate the solar array.
6. The PV system wherein the base frame assemblies vary in distance from each other.
7. The PV system wherein the control unit further comprises a drive mechanism coupled to the at least one torque member which extends along the rotational axis.
8. The PV system wherein the drive mechanism is linked to the solar array in the north-south direction to connect adjacent ones of the PV tables extending in the north-south direction for rotational drive, in unison.
9. The PV system wherein a single motor is used to rotate the PV tables.
10. The PV system wherein the PV tables are wirelessly coupled to the control unit and configured to rotate via a plurality of motors.
11. The PV system wherein the PV tables are linearly arranged in the north-south direction.
12. The PV system wherein the solar array comprises a plurality of linear arrangements of PV tables that are not coupled to each other.
13. The PV system further comprising connecting members extending substantially along the north-south direction, and each connecting member is coupled to a respective elongated member of a respective PV module.
14. The PV system wherein, due to the tilt angle of the PV tables, the PV tables are not co-planar with respect to each other.
15. The PV system wherein the PV modules are grouped on the PV tables, all of the PV modules in a given PV table are co-planar, and the PV modules on different PV tables are not co-planar.
16. The PV system further comprising an adjacent PV table in the solar array that is mechanically linked to the PV tables with a single drive mechanism.
17. The PV system further comprising additional adjacent PV tables in the solar array that are independently driven by linked motors to synchronously rotate.
18. The PV system further comprising additional adjacent PV tables in the solar array that are synchronized to rotate with the PV tables via a control unit, and the control unit is the only control unit in the solar array.
19. The PV system wherein the PV tables in the solar array are physically connected and are controlled via wireless communication.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. A photovoltaic (PV) system, comprising:
    PV modules having support frame assemblies;
    base frame assemblies, each having an upper portion and a lower portion, the upper portion is coupled to a respective support frame assembly such that the PV modules are oriented at a tilt angle with respect to horizontal to form a solar array of PV tables;
    elongated members extending in a north-south direction, each elongated member is directly attached with the upper portion of two respective base frame assemblies, and the elongated members are configured to be coupled to a control unit and rotate the PV tables about a rotational axis that is oriented at the tilt angle, which is fixed; and the control unit coupled to the base frame assemblies and the elongated members such that the control unit is configured to rotate the PV tables about the rotational axis.

2. The PV system of claim 1, wherein the tilt angle is in a range of 3° to 15°.

3. The PV system of claim 1, wherein the tilt angle is in a range of 3° to 8°.

4. The PV system of claim 1, wherein the control unit is configured to adjust a rotational angle of the PV tables in a range of 0° to 120°, from −60° in an easterly direction to +60° in a westerly direction, relative to the rotational axis.

5. The PV system of claim 1, wherein the base frame assemblies extend along the north-south direction, and the rotational axis extends along the north-south direction, such that the solar array is configured to be angled from horizontal in the north-south direction and can rotate about the rotational axis from east to west; and the control unit further comprises:
at least one torque member configured to articulate the solar array.

6. The PV system of claim 5, wherein the base frame assemblies vary in distance from each other.

7. The PV system of claim 5, wherein the control unit further comprises a drive mechanism coupled to the at least one torque member which extends along the rotational axis.

8. The PV system of claim 7, wherein the drive mechanism is linked to the solar array in the north-south direction to connect adjacent ones of the PV tables extending in the north-south direction for rotational drive, in unison.

9. The PV system of claim 8, wherein a single motor is used to rotate the PV tables.

10. The PV system of claim 1, wherein the PV tables are wirelessly coupled to the control unit and configured to rotate via a plurality of motors.

11. The PV system of claim 1, wherein the PV tables are linearly arranged in the north-south direction.

12. The PV system of claim 11, further comprising connecting members extending substantially along the north-south direction, and each connecting member is coupled to a respective elongated member of a respective PV module.

13. The PV system of claim 1 wherein, due to the tilt angle of the PV tables, the PV tables are not co-planar with respect to each other.

14. The PV system of claim 1, wherein the PV modules are grouped on the PV tables, all of the PV modules in a given PV table are co-planar, and the PV modules on different PV tables are not co-planar.

15. The PV system of claim 1, further comprising an adjacent PV table in the solar array that is mechanically linked to the PV tables with a single drive mechanism.

16. The PV system of claim 1, further comprising additional adjacent PV tables in the solar array that are independently driven by linked motors to synchronously rotate.

17. The PV system of claim 1, further comprising additional adjacent PV tables in the solar array that are synchronized to rotate with the PV tables via a control unit, and the control unit is the only control unit in the solar array.

18. The PV system of claim 1, wherein the PV tables in the solar array are physically connected and are controlled via wireless communication.

* * * * *